United States Patent
Moriguchi

(10) Patent No.: US 12,292,288 B2
(45) Date of Patent: *May 6, 2025

(54) AZIMUTH/ATTITUDE ANGLE MEASURING DEVICE

(71) Applicant: Sumitomo Precision Products Co., Ltd., Amagasaki (JP)

(72) Inventor: Takafumi Moriguchi, Amagasaki (JP)

(73) Assignee: Sumitomo Precision Products Co., Ltd., Amagasaki (JP)

( * ) Notice: Subject to any disclaimer, the term of this patent is extended or adjusted under 35 U.S.C. 154(b) by 386 days.

This patent is subject to a terminal disclaimer.

(21) Appl. No.: 17/913,251

(22) PCT Filed: Mar. 23, 2021

(86) PCT No.: PCT/JP2021/011897
§ 371 (c)(1),
(2) Date: Sep. 21, 2022

(87) PCT Pub. No.: WO2021/193597
PCT Pub. Date: Sep. 30, 2021

(65) Prior Publication Data
US 2023/0140455 A1 May 4, 2023

(30) Foreign Application Priority Data
Mar. 24, 2020 (JP) .............................. 2020-052433

(51) Int. Cl.
*G01C 21/16* (2006.01)
*G01C 17/28* (2006.01)
*G01C 19/5712* (2012.01)

(52) U.S. Cl.
CPC ............. *G01C 21/16* (2013.01); *G01C 17/28* (2013.01); *G01C 19/5712* (2013.01)

(58) Field of Classification Search
CPC .... G01C 21/16; G01C 17/28; G01C 19/5712; G01C 19/5755; G01C 25/005; G01C 19/5726
See application file for complete search history.

(56) References Cited

U.S. PATENT DOCUMENTS 11,982,532 B1 * 5/2024 Moriguchi ........... G01C 25/005
2016/0377433 A1 * 12/2016 Moriguchi ......... G01C 19/5677
73/504.12

FOREIGN PATENT DOCUMENTS

JP    2009-115559 A    5/2009
JP    6761140 B1    9/2020

OTHER PUBLICATIONS

International Search Report (PCT/ISA/210) issued in PCT Application No. PCT/JP2021/011897 dated Jun. 15, 2021 with English translation (five (5) pages).
(Continued)

*Primary Examiner* — Matthew G Marini
*Assistant Examiner* — Leo T Hinze
(74) *Attorney, Agent, or Firm* — Crowell & Moring LLP

(57) ABSTRACT

The azimuth/attitude angle measuring device (100) includes a first angular velocity sensor (103), a second angular velocity sensor (104), a power supply unit (102), and a control unit (101). The control unit is configured so that, when an angular velocity, which is to be used in an operation before and after interchanging a function of a primary side control circuit (12) and a function of a secondary side control circuit (13), is detected by one of the first angular velocity sensor and the second angular velocity sensor, the control unit does not perform control for interchanging the function of the primary side control circuit and the function of the secondary side control circuit in the other of the first angular velocity sensor and the second angular velocity sensor.

12 Claims, 6 Drawing Sheets

(56) References Cited

OTHER PUBLICATIONS

Japanese-language Written Opinion (PCT/ISA/237) issued in PCT Application No. PCT/JP2021/011897 dated Jun. 15, 2021 (four (4) pages).

* cited by examiner

AZIMUTH/ATTITUDE ANGLE MEASURING DEVICE

TECHNICAL FIELD

The present invention relates to an azimuth/attitude angle measuring device, and more particularly to an azimuth/attitude angle measuring device including a plurality of angular velocity sensors.

BACKGROUND ART

In the related art, an azimuth/attitude angle measuring device including a plurality of angular velocity sensors is known. For example, the azimuth/attitude angle measuring device is disclosed in Japanese Unexamined Patent Publication No. 2009-115559.

Japanese Unexamined Patent Publication No. 2009-115559 discloses an electronic device (azimuth/attitude angle measuring device) including the plurality of angular velocity sensors. In the angular velocity sensor of the electronic device, an element portion having a ring shape and a plurality of electrodes are disposed in a circumferential shape on the radial outer side of the element portion having a ring shape. The plurality of electrodes include a primary electrode and a secondary electrode. An AC power supply that generates primary vibration in the element portion having a ring shape is connected to one of the primary electrode and the secondary electrode by applying an AC voltage to one of the primary electrode and the secondary electrode. Further, detection means for detecting the magnitude of an electric signal generated in the other of the primary electrode and the secondary electrode is connected to the other of the primary electrode and the secondary electrode. Then, when rotational motion is generated in the normal direction of the element portion in a state in which the primary vibration is generated in the element portion having a ring shape, secondary vibration according to the angular velocity of the rotational motion is generated in the element portion. Then, the magnitude of the electric signal generated in the other of the primary electrode and the secondary electrode due to the secondary vibration is detected by the detection means connected to the other of the primary electrode and the secondary electrode. Further, the AC voltage for cancelling the secondary vibration is applied to one of the primary electrode and the secondary electrode based on the magnitude of the detected electric signal. Then, the magnitude of the angular velocity is operated based on the magnitude of the AC voltage for cancelling the secondary vibration.

Further, in the angular velocity sensor according to the related art as disclosed in Japanese Unexamined Patent Publication No. 2009-115559, an angular velocity detected by the angular velocity sensor contains a bias component. The bias component is generated due to the asymmetry of a gyro element included in the angular velocity sensor. Therefore, the angular velocity sensor according to the related art as in Japanese Unexamined Patent Publication No. 2009-115559 is configured to cancel the bias component by switching between the electrode to which the AC power supply is connected (one of the primary electrode and the secondary electrode) and the electrode to which the detection means is connected (the other of the primary electrode and the secondary electrode), and by differentiating the outputs of the angular velocity sensor before and after switching.

CITATION LIST

Patent Literature

[PTL 1] Japanese Unexamined Patent Publication No. 2009-115559

SUMMARY OF INVENTION

Technical Problem

In an angular velocity sensor according to the related art as in Japanese Unexamined Patent Publication No. 2009-115559, a bias component is cancelled by switching between an electrode to which the AC power supply is connected (one of a primary electrode and a secondary electrode) and an electrode to which detection means is connected (the other of the primary electrode and the secondary electrode) and by differentiating the outputs of the angular velocity sensor before and after being switched. Therefore, in an azimuth/attitude angle measuring device including a plurality of angular velocity sensors, the power fluctuation of the AC power supply is generated when switching between the electrode to which the AC power supply is connected (one of the primary electrode and the secondary electrode) in order to cancel the bias component of one angular velocity sensor and the electrode to which the detection means is connected (the other of the primary electrode and the secondary electrode). In this case, it is difficult for other angular velocity sensors connected to a common AC power supply to accurately detect the angular velocity due to the power fluctuation of the AC power supply. Therefore, a vibration-type angular velocity sensor capable of accurately detecting the angular velocity in each of the plurality of angular velocity sensors is desired.

The present invention has been made to solve the above-mentioned problems, and one object of the present invention is to provide a vibration-type angular velocity sensor capable of accurately detecting an angular velocity in each of a plurality of angular velocity sensors connected to a common power supply unit.

Solution to Problem

In order to achieve the above object, according to a first aspect of the present invention, there is provided an azimuth/attitude angle measuring device including a first angular velocity sensor that detects an angular velocity around a first axis, a second angular velocity sensor that detects an angular velocity around a second axis in a direction different from the first axis, a power supply unit that supplies power to the first angular velocity sensor and the second angular velocity sensor; and a control unit, in which the first angular velocity sensor and the second angular velocity sensor each include a vibrator, a primary side control circuit that has a closed control loop, an output of the closed control loop inducing primary vibration in the vibrator, and a secondary side control circuit that has a closed control loop for detecting secondary vibration generated in the vibrator due to an angular velocity applied to the vibrator, the primary side control circuit and the secondary side control circuit are configured so that a function as the primary side control circuit and a function as the secondary side control circuit are interchangeable, and the control unit is configured so that, when an angular velocity to be used for an operation before and after interchanging the function of the primary side control circuit and the function of the secondary side control circuit is detected by one of the first angular velocity sensor and the second angular velocity sensor, the control unit does not perform control for interchanging the function of the primary side control circuit and the function of the secondary side control circuit in the other of the first angular velocity sensor and the second angular velocity sensor.

As described above, the azimuth/attitude angle measuring device according to the first aspect of the present invention is provided with the control unit configured so that, when the angular velocity to be used for the operation before and after interchanging the function of the primary side control circuit and function of the secondary side control circuit is detected by one of the first angular velocity sensor and the second angular velocity sensor, the control unit does not perform control for interchanging the function of the primary side control circuit and the function of the secondary side control circuit in the other of the first angular velocity sensor and the second angular velocity sensor. As a result, when the angular velocity to be used for the operation is detected by one of the first angular velocity sensor and the second angular velocity sensor, the function of the primary side control circuit and the function of the secondary side control circuit are not interchanged in the other of the first angular velocity sensor and the second angular velocity sensor. Therefore, the power of the power supply unit provided in common does not fluctuate due to the interchange of the function of the primary side control circuit and the function of the secondary side control circuit. As a result, since power is stably supplied from the power supply unit to one of the first angular velocity sensor and the second angular velocity sensor, it is possible to accurately detect the angular velocity to be used for the operation. As a result, it is possible to accurately detect the angular velocity in each of the plurality of angular velocity sensors connected to a common power supply unit.

In the azimuth/attitude angle measuring device according to the first aspect, preferably, the control unit is configured to perform an operation of cancelling a bias component of the angular velocity detected by the first angular velocity sensor and the second angular velocity sensor based on a detection result of the angular velocity at which the secondary vibration of the vibrator is detected by the secondary side control circuit, and a detection result of the angular velocity at which the function of the primary side control circuit and the function of the secondary side control circuit is interchanged, and the secondary vibration of the vibrator is detected by the primary side control circuit. With this configuration, it is possible to accurately calculate the bias component of the angular velocity detected by the first angular velocity sensor and the second angular velocity sensor based on the angular velocity detected in a state in which power is stably supplied from the power supply unit.

In this case, preferably, the control unit is configured to interrupt detection of an angular velocity to cancel a bias component of the angular velocity in a predetermined period before and after interchanging the function of the primary side control circuit and the function of the secondary side control circuit. With this configuration, the detection of the angular velocity to cancel the bias component of the angular velocity is interrupted in a period during which the fluctuation of the power of the power supply unit is generated due to the interchange of the function of the primary side control circuit and the function of the secondary side control circuit, so that it is possible to effectively suppress the detection accuracy of the angular velocity to be used for the operation of cancelling the bias component from decreasing.

In the azimuth/attitude angle measuring device according to the first aspect, preferably, the control unit is configured so that, in a predetermined period before and after interchanging the function of the primary side control circuit and the function of the secondary side control circuit in one of the first angular velocity sensor and the second angular velocity sensor, the control unit performs control for interchanging the function of the primary side control circuit and the function of the secondary side control circuit in the other of the first angular velocity sensor and the second angular velocity sensor. With this configuration, it is possible to perform a timing of interchanging the function of the primary side control circuit and the function of the secondary side control circuit in the first angular velocity sensor and a timing of interchanging the function of the primary side control circuit and the function of the secondary side control circuit in the second angular velocity sensor in a predetermined period during which the detection of the angular velocity to cancel the bias component of the angular velocity is interrupted. As a result, when the angular velocity to cancel the bias component of the angular velocity is detected in parallel in both the first angular velocity sensor and the second angular velocity sensor, it is possible to accurately detect each angular velocity to be used for the operation.

In this case, preferably, the control unit is configured to set timings of interchanging the function of the primary side control circuit and the function of the secondary side control circuit in the first angular velocity sensor and the second angular velocity sensor, to be approximately simultaneous. With this configuration, it is possible to minimize the predetermined period during which the detection of the angular velocity to cancel the bias component of the angular velocity is interrupted, so that it is possible to suppress time for detecting the angular velocity to cancel the bias component from becoming long.

In the azimuth/attitude angle measuring device according to the first aspect preferably further includes a third angular velocity sensor that includes a vibrator and detects the angular velocity around the first axis, in which the power supply unit is configured to supply power to the third angular velocity sensor in addition to the first angular velocity sensor and the second angular velocity sensor, and the control unit is configured so that, when the angular velocity to be used for the operation is detected by the third angular velocity sensor, the control unit does not perform control for interchanging the function of the primary side control circuit and the function of the secondary side control circuit in the first angular velocity sensor. With this configuration, in a configuration provided with the first angular velocity sensor and the third angular velocity sensor that detect the angular velocity around the same first axis, it is possible to accurately detect the angular velocity to be used for the operation in the third angular velocity sensor.

According to a second aspect of the present invention, there is provided an azimuth/attitude angle measuring device including a first angular velocity sensor that detects an angular velocity around a first axis, a second angular velocity sensor that detects an angular velocity around a second axis in a direction different from the first axis, a power supply unit that supplies power to the first angular velocity sensor and the second angular velocity sensor, and a control unit, in which the first angular velocity sensor and the second angular velocity sensor each include a vibrator, a primary side control circuit that has a closed control loop, an output of the closed control loop inducing primary vibration in the vibrator, and a secondary side control circuit that has a closed control loop for detecting secondary vibration generated in the vibrator due to an angular velocity applied to the vibrator, a configuration is made so that a function of inducing the primary vibration and a function of detecting the secondary vibration are interchangeable, and the control unit is configured so that, when an angular velocity to be used for an operation before and after interchanging the function of inducing the primary vibration and the function of detecting the secondary vibration is detected by one of the first angular velocity sensor and the second angular velocity sensor, the control unit does not perform control for interchanging the function of inducing the primary vibration and the function of detecting the secondary vibration in the other of the first angular velocity sensor and the second angular velocity sensor.

As described above, the azimuth/attitude angle measuring device according to the second aspect of the present invention is provided with the control unit configured so that, when the angular velocity to be used for the operation before and after interchanging the function of inducing the primary vibration and the function of detecting the secondary vibration is detected by one of the first angular velocity sensor and the second angular velocity sensor, the control unit does not perform control for interchanging the function of inducing the primary vibration and the function of detecting the secondary vibration in the other of the first angular velocity sensor and the second angular velocity sensor. As a result, when the angular velocity to be used for the operation is detected by one of the first angular velocity sensor and the second angular velocity sensor, the function of inducing the primary vibration and the function of detecting the secondary vibration are not interchanged in the other of the first angular velocity sensor and the second angular velocity sensor. Therefore, the power of the power supply unit provided in common does not fluctuate due to the interchange of the function of inducing the primary vibration and the function of detecting the secondary vibration. As a result, since power is stably supplied from the power supply unit to one of the first angular velocity sensor and the second angular velocity sensor, it is possible to accurately detect the angular velocity to be used for the operation. As a result, it is possible to accurately detect the angular velocity in each of the plurality of angular velocity sensors connected to a common power supply unit.

In the azimuth/attitude angle measuring device according to the second aspect, preferably, the control unit is configured to perform an operation of cancelling a bias component of the angular velocity detected by the first angular velocity sensor and the second angular velocity sensor based on a detection result of the angular velocity at which the secondary vibration of the vibrator is detected, and a detection result of the angular velocity at which the secondary vibration of the vibrator is detected by interchanging the function of inducing the primary vibration and the function of detecting the secondary vibration. With this configuration, it is possible to accurately calculate the bias component of the angular velocity detected by the first angular velocity sensor and the second angular velocity sensor based on the angular velocity detected in a state in which power is stably supplied from the power supply unit.

In this case, preferably, the control unit is configured to interrupt detection of an angular velocity to cancel the bias component of the angular velocity in a predetermined period before and after interchanging the function of inducing the primary vibration and the function of detecting the secondary vibration. With this configuration, the detection of the angular velocity to cancel the bias component of the angular velocity is interrupted in a period during which the fluctuation of the power of the power supply unit is generated due to the interchange of the function of inducing the primary vibration and the function of detecting the secondary vibration, so that it is possible to effectively suppress the detection accuracy of the angular velocity to be used for the operation of cancelling the bias component from decreasing.

In the azimuth/attitude angle measuring device according to the second aspect, preferably, the control unit is configured so that, in a predetermined period before and after interchanging the function of inducing the primary vibration and the function of detecting the secondary vibration in one of the first angular velocity sensor and the second angular velocity sensor, the control unit performs control for interchanging the function of inducing the primary vibration and the function of detecting the secondary vibration in the other of the first angular velocity sensor and the second angular velocity sensor. With this configuration, it is possible to perform a timing of interchanging the function of inducing the primary vibration of the first angular velocity sensor and the function of detecting the secondary vibration in the first angular velocity sensor and a timing of interchanging the function of inducing the primary vibration of the second angular velocity sensor and the function of detecting the secondary vibration in the second angular velocity sensor in a predetermined period during which the detection of the angular velocity to cancel the bias component of the angular velocity is interrupted. As a result, when the angular velocity to cancel the bias component of the angular velocity is detected in parallel in both the first angular velocity sensor and the second angular velocity sensor, it is possible to accurately detect each angular velocity to be used for the operation.

In this case, preferably, the control unit is configured to set timings of interchanging the function of inducing the primary vibration and the function of detecting the secondary vibration in the first angular velocity sensor and the second angular velocity sensor, to be approximately simultaneous. With this configuration, it is possible to minimize the predetermined period during which the detection of the angular velocity to cancel the bias component of the angular velocity is interrupted, so that it is possible to suppress time for detecting the angular velocity to cancel the bias component from becoming long.

The azimuth/attitude angle measuring device according to the second aspect, preferably, further includes a third angular velocity sensor that includes a vibrator and detects the angular velocity around the first axis, in which the power supply unit is configured to supply power to the third angular velocity sensor in addition to the first angular velocity sensor and the second angular velocity sensor, and the control unit is configured so that, when the angular velocity to be used for the operation is detected by the third angular velocity sensor, the control unit does not perform control for interchanging the function of inducing the primary vibration and the function of detecting the secondary vibration in the first angular velocity sensor. With this configuration, in a configuration provided with the first angular velocity sensor and the third angular velocity sensor that detect the angular velocity around the same first axis, it is possible to accurately detect the angular velocity to be used for the operation in the third angular velocity sensor.

Advantageous Effects of Invention

According to the present invention, as described above, it is possible to accurately detect an angular velocity in each of a plurality of angular velocity sensors connected to a common power supply unit.

DESCRIPTION OF EMBODIMENTS

Hereinafter, embodiments of the present invention will be described with reference to the drawings.

First Embodiment

The configuration of an azimuth/attitude angle measuring device 100 according to a first embodiment will be described with reference to FIGS. 1 to 4.

The azimuth/attitude angle measuring device 100 is configured to detect an azimuth angle and an attitude angle. Specifically, the azimuth/attitude angle measuring device 100 is configured to detect angular velocities around an X axis, a Y axis, and a Z axis orthogonal to each other, respectively, and detect three-dimensional azimuth angles and attitude angles based on the detected angular velocities.

Figure 1:
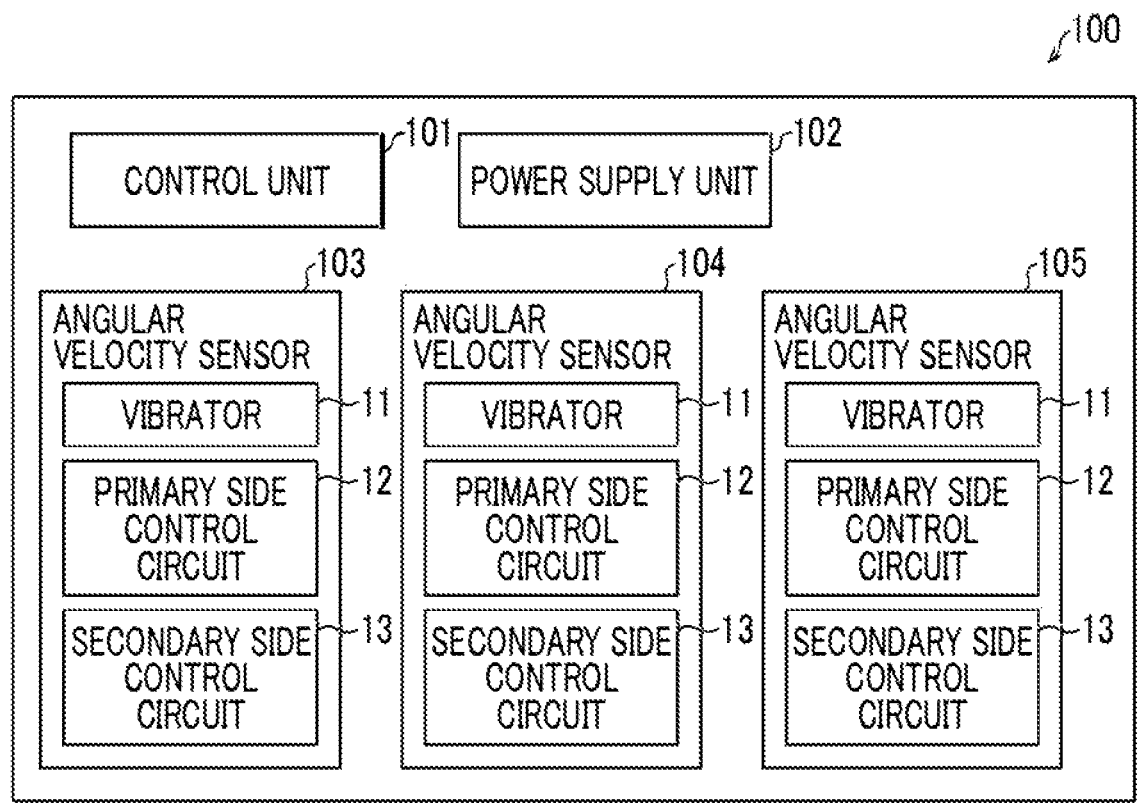
FIG. 1 is a block diagram showing a configuration of an azimuth/attitude angle measuring device according to a first embodiment.
Figure 2:
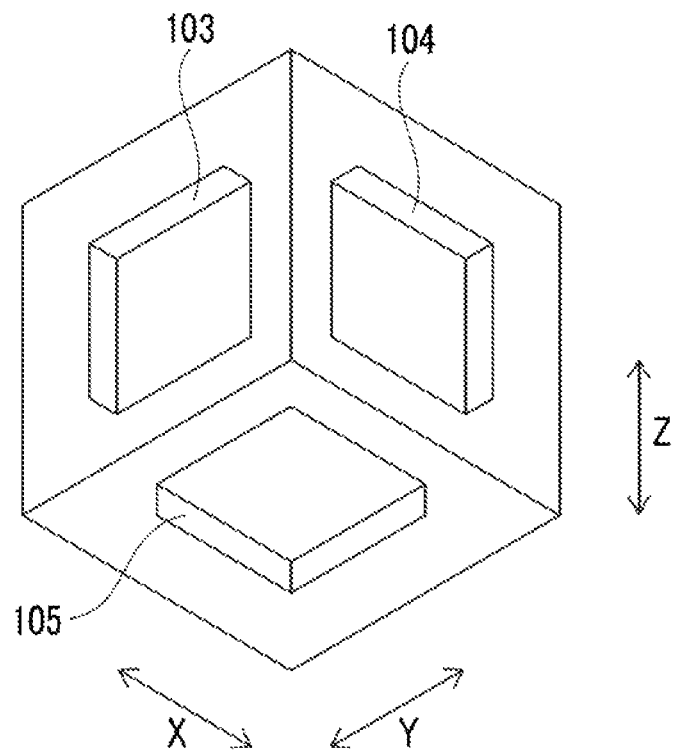
FIG. 2 is a perspective view showing a plurality of angular velocity sensors of the azimuth/attitude angle measuring device according to the first embodiment.

As shown in FIG. 1, the azimuth/attitude angle measuring device 100 includes a control unit 101, a power supply unit 102, an angular velocity sensor 103, an angular velocity sensor 104, and an angular velocity sensor 105. The angular velocity sensor 103, the angular velocity sensor 104, and the angular velocity sensor 105 are configured to detect angular velocities around the axes that intersect each other. Specifically, as shown in FIG. 2, the angular velocity sensor 103 is configured to detect the angular velocity around the X axis. Further, the angular velocity sensor 104 is configured to detect the angular velocity around the Y axis. Further, the angular velocity sensor 105 is configured to detect the angular velocity around the Z axis. That is, the angular velocity sensor 103, the angular velocity sensor 104, and the angular velocity sensor 105 are configured to detect the angular velocities around the axes orthogonal to each other. Note that, the angular velocity sensor 103 is an example of a "first angular velocity sensor" in the claims. Further, the angular velocity sensor 104 is an example of a "second angular velocity sensor" in the claims. Further, the angular velocity sensor 105 is an example of the "second angular velocity sensor" in the claims.

The control unit 101 is configured to control each unit of the azimuth/attitude angle measuring device 100. The control unit 101 includes a Central Processing Unit (CPU) and a memory.

The power supply unit 102 is configured to supply power to each unit of the azimuth/attitude angle measuring device 100. Specifically, the power supply unit 102 is configured to supply power to the angular velocity sensors 103, 104 and 105. Further, the power supply unit 102 is configured to supply AC power to the angular velocity sensors 103, 104 and 105. The power supply unit 102 is configured to be supplied with power from an external power source or a battery provided in the azimuth/attitude angle measuring device 100. For example, the power supply unit 102 is a power conversion circuit that converts the supplied power. The power supply unit 102 includes a switching element, a capacitor, a diode, and the like.

As shown in FIG. 1, each of the angular velocity sensors 103, 104 and 105 includes a vibrator 11, a primary side control circuit 12 that has a closed control loop, the output of the closed control loop inducing primary vibration in the vibrator 11, and a secondary side control circuit 13 that has a closed control loop which detects secondary vibration generated in the vibrator 11 due to the angular velocity applied to the vibrator 11. The vibrator 11 includes a ring-type vibrator.

Figure 3:
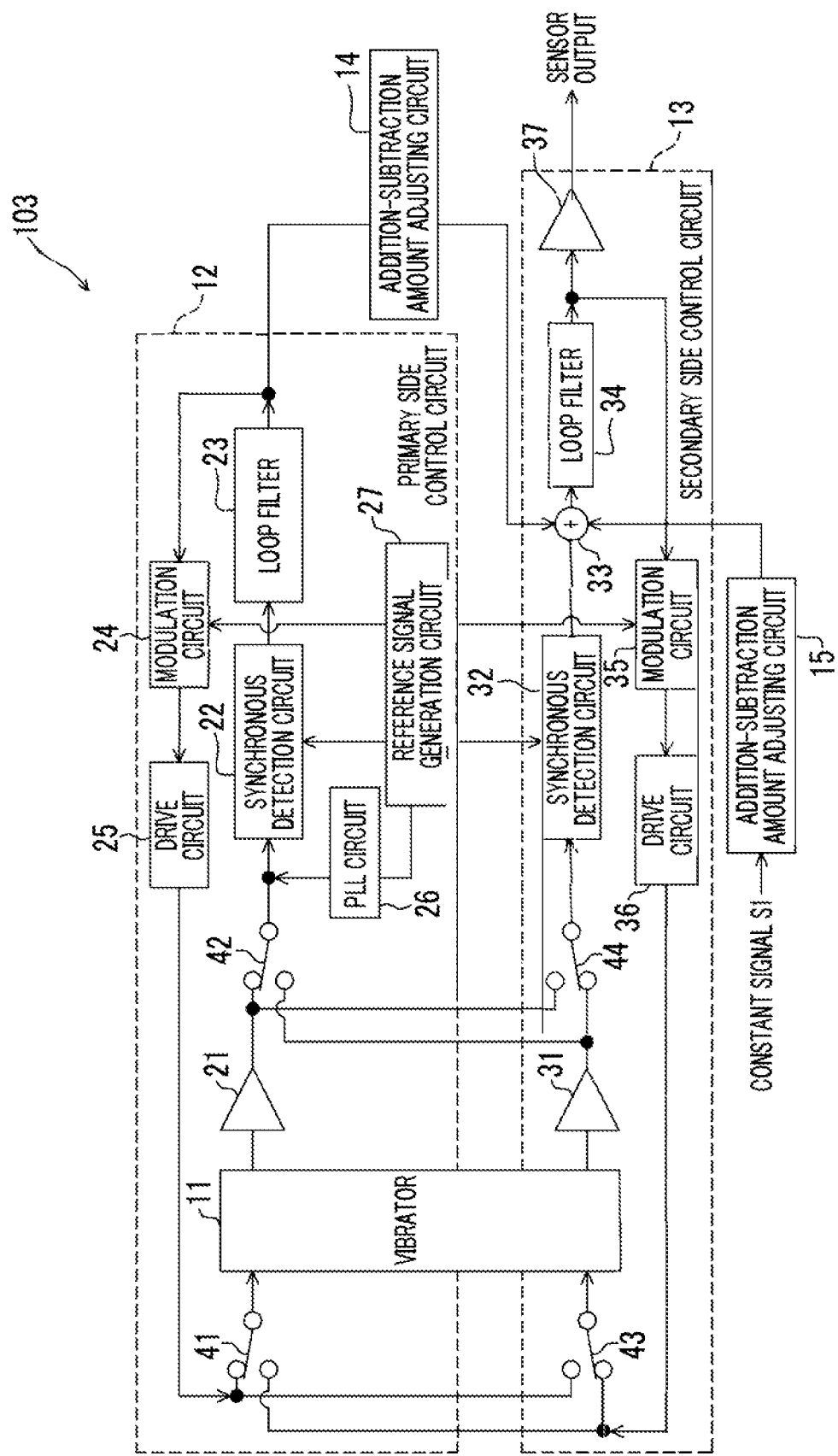
FIG. 3 is a block diagram showing a circuit configuration of the angular velocity sensor according to the first embodiment.
Figure 4:
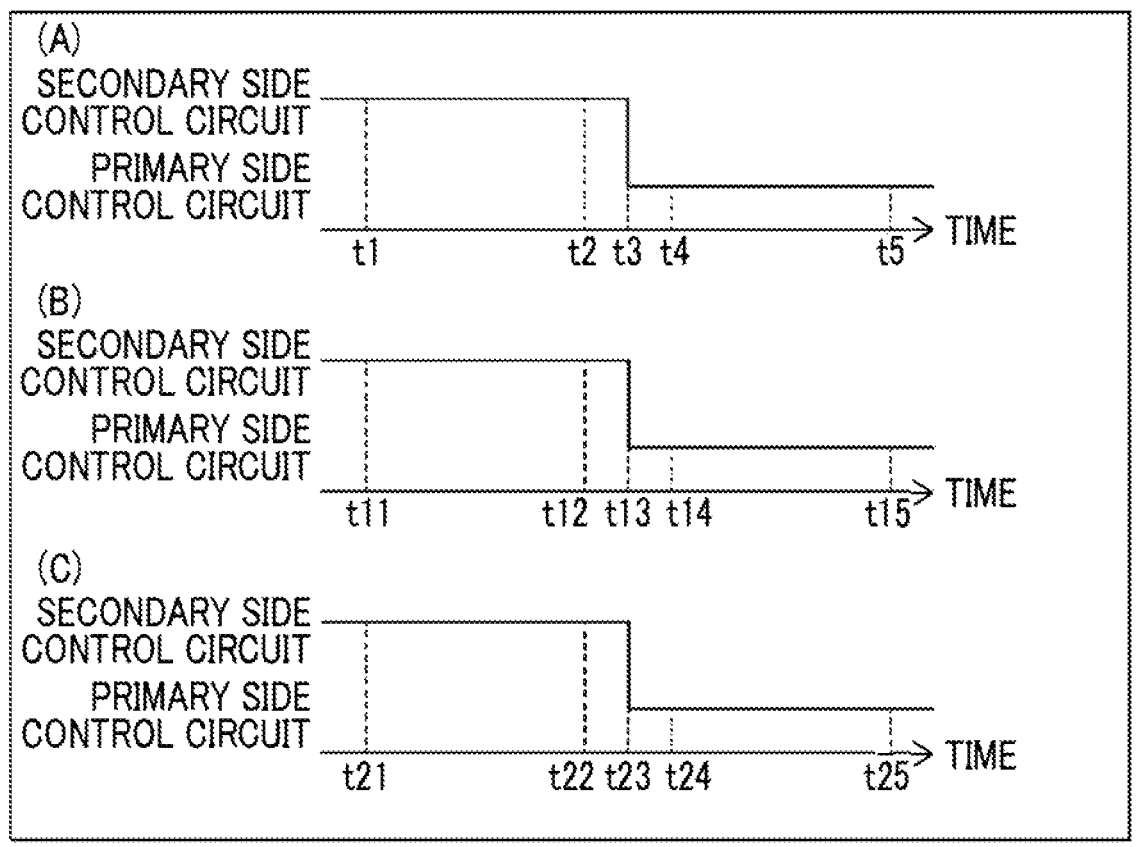
FIG. 4 is a diagram for explaining a timing of interchanging the function of a primary side control circuit and the function of a secondary side control circuit in the plurality of angular velocity sensors according to the first embodiment.

As shown in FIG. 3, the primary side control circuit 12 in the angular velocity sensor 103 (104, 105) includes an amplifier circuit 21, a synchronous detection circuit 22, a loop filter 23, a modulation circuit 24, a drive circuit 25, a Phase Locked Loop (PLL) circuit (phase synchronous circuit) 26, and a reference signal generation circuit 27. Then, the vibrator 11, the amplifier circuit 21, the synchronous detection circuit 22, the loop filter 23, the modulation circuit 24, and the drive circuit 25 are connected in this order to form the closed control loop. The loop filter 23 includes, for example, an integral filter. Note that, although FIG. 3 shows the configuration of the angular velocity sensor 103, the angular velocity sensors 104 and 105 also have the same configuration.

The secondary side control circuit 13 of the angular velocity sensor 103 (104, 105) includes an amplifier circuit 31, a synchronous detection circuit 32, an adder circuit 33, a loop filter 34, a modulation circuit 35, a drive circuit 36, and an amplifier circuit. 37. Then, the vibrator 11, the amplifier circuit 31, the synchronous detection circuit 32, the adder circuit 33, the loop filter 34, the modulation circuit 35, and the drive circuit 36 are connected in this order to form the closed control loop. The adder circuit 33 is composed of a general addition-subtraction circuit using an operational amplifier. Further, the loop filter 34 includes, for example, an integral filter. Further, the output of the loop filter 34 is input to the amplifier circuit 37. Then, a signal output from the amplifier circuit 37 is output as the sensor output of the angular velocity sensor 103 (104, 105).

Here, in the present embodiment, the primary side control circuit 12 and the secondary side control circuit 13 in the angular velocity sensor 103 (104, 105) are configured so that a function as the primary side control circuit 12 and a function as the secondary side control circuit 13 are interchangeable. Specifically, in the primary side control circuit 12, a switch 41 is provided on the input side of a signal with respect to the vibrator 11 and a switch 42 is provided on the output side of the signal with respect to the vibrator 11 (output side of the amplifier circuit 21). Further, in the secondary side control circuit 13, a switch 43 is provided on the input side of a signal with respect to the vibrator 11 and a switch 44 is provided on the output side of a signal with respect to the vibrator 11 (output side of the amplifier circuit 31). The switch 41, the switch 42, the switch 43, and the switch 44 are configured to be able to switch between a state of being connected to the primary side control circuit 12 and a state of being connected to the secondary side control circuit 13, respectively. That is, the angular velocity sensor 103 (104, 105) is configured so that a function of inducing the primary vibration and a function of detecting the secondary vibration are interchangeable.

FIG. 3, the switch 41 and the switch 42 show the state of being connected to the primary side control circuit 12, and the switch 43 and the switch 44 show the state of being connected to the secondary side control circuit 13. Further, the switch 41 and the switch 42 are switched so as to be connected to the secondary side control circuit 13, and the switch 43 and the switch 44 are switched so as to be connected to the primary side control circuit 12, so that the function as the primary side control circuit 12 and the function as the secondary side control circuit 13 are interchanged with each other.

Further, the angular velocity sensor 103 (104, 105) is provided with an addition-subtraction amount adjusting circuit 14 to which an output from the primary side control circuit 12 (output from the loop filter 23) is input. The addition-subtraction amount adjusting circuit 14 is configured to adjust the magnitude of the output of the loop filter 23 of the primary side control circuit 12 dependent on temperature so that the adjusted output (first offset value) is input to the adder circuit 33 of the secondary side control circuit 13. For example, in the addition-subtraction amount adjusting circuit 14, the addition amount of the first offset value is adjusted by dividing a voltage using a potentiometer (volume resistance) or the like.

Further, the angular velocity sensor 103 (104, 105) is provided with an addition-subtraction amount adjusting circuit 15 to which a constant signal S1 independent of temperature is input. The addition-subtraction amount adjusting circuit 15 is configured to adjust the magnitude of the constant signal S1 so that the adjusted constant signal S1 (second offset value) is input to the adder circuit 33 of the secondary side control circuit 13. For example, in the addition-subtraction amount adjusting circuit 15, the addition amount of the constant signal S1 is adjusted by dividing a voltage using a potentiometer (volume resistance) or the like.

Here, in the first embodiment, the control unit 101 is configured so that, when an angular velocity to be used for an operation before and after interchanging the function of the primary side control circuit 12 and the function of the secondary side control circuit 13 is detected by any one of the angular velocity sensors 103 to 105, the control unit does not perform control for interchanging the function of the primary side control circuit 12 and the function of the secondary side control circuit 13 in the other angular velocity sensor in the angular velocity sensors 103 to 105.

Here, when power is supplied from the power supply unit 102 and the angular velocity sensor 103 (104, 105) is driven, the angular velocity sensor 103 (104, 105) always detects the angular velocity and outputs a signal based on the detected angular velocity. The control unit 101 is configured to operate the attitude angle and the azimuth angle based on the signal output from the angular velocity sensor 103 (104, 105). Further, the control unit 101 is configured to perform an operation of calculating the bias component of the angular velocity sensor 103 (104, 105) based on the signal output from the angular velocity sensor 103 (104, 105). When the function of the primary side control circuit 12 and the function of the secondary side control circuit 13 are interchanged in the angular velocity sensors 103 to 105, the control unit 101 does not use the angular velocities detected by the other of the angular velocity sensors 103 to 105 for the operation.

Further, the control unit 101 is configured to perform an operation of cancelling the bias component of the angular velocity detected by the angular velocity sensor 103 (104, 105) based on a detection result of the angular velocity at which the secondary vibration of the vibrator 11 is detected by the secondary side control circuit 13 in the angular velocity sensor 103 (104, 105), and a detection result of the angular velocity at which the secondary vibration of the vibrator 11 is detected by the primary side control circuit 12 by interchanging the function of the primary side control circuit 12 and the function of the secondary side control circuit 13 in the angular velocity sensor 103 (104, 105).

Specifically, the control unit 101 detects (acquires) the angular velocity at which the secondary vibration of the vibrator 11 is detected by the secondary side control circuit 13 in the angular velocity sensor 103 in a period from time t1 to time t2 in FIG. 4(A). Further, the control unit 101 detects (acquires) the angular velocity at which the secondary vibration of the vibrator 11 is detected by the primary side control circuit 12 in the angular velocity sensor 103 in a period from time t4 to time t5 in FIG. 4(A). Then, the control unit 101 calculates the bias component of the angular velocity sensor 103 based on the angular velocity acquired in the period from time t1 to time t2 and the angular velocity acquired in the period from time t4 to time t5.

Further, the control unit 101 acquires the angular velocity at which the secondary vibration of the vibrator 11 is detected by the secondary side control circuit 13 in the angular velocity sensor 104 for the operation in the period from time t11 to time t12 in FIG. 4(B). Further, the control unit 101 acquires the angular velocity at which the secondary vibration of the vibrator 11 is detected by the primary side control circuit 12 in the angular velocity sensor 104 for the operation in a period from time t14 to time t15 in FIG. 4(B). Then, the control unit 101 calculates (operates) the bias component of the angular velocity sensor 104 based on the angular velocity acquired in the period from time t11 to time t12 and the angular velocity acquired in the period from time t14 to time t15.

Further, the control unit 101 acquires the angular velocity at which the secondary vibration of the vibrator 11 is detected by the secondary side control circuit 13 in the angular velocity sensor 105 for the operation in a period from time t21 to time t22 in FIG. 4(C). Further, the control unit 101 acquires the angular velocity at which the secondary vibration of the vibrator 11 is detected by the primary side control circuit 12 in the angular velocity sensor 105 for the operation in a period from time t24 to time t25 in FIG. 4(C). Then, the control unit 101 calculates (operates) the bias component of the angular velocity sensor 105 based on the angular velocity acquired in the period from time t21 to time t22 and the angular velocity acquired in the period from time t24 to time t25.

Further, the control unit 101 is configured to interrupt the detection of the angular velocity to cancel the bias component of the angular velocity of the angular velocity sensor 103 (104, 105) in a predetermined period before and after interchanging the function of the primary side control circuit 12 and the function of the secondary side control circuit 13 in the angular velocity sensor 103 (104, 105). Specifically, in a predetermined period (period from time t2 to time t4) before and after a timing (time t3) of interchanging the function of the primary side control circuit 12 and the function of the secondary side control circuit 13 in the angular velocity sensor 103 of FIG. 4(A), the control unit 101 interrupts the detection (acquisition for the operation) of the angular velocity to cancel the bias components of the angular velocities of the angular velocity sensors 104 and 105. Further, in a predetermined period of FIG. 4(B) (period from time t12 to time t14) before and after a timing (time t13) of interchanging the function of the primary side control circuit 12 and the function of the secondary side control circuit 13 in the angular velocity sensor 104, the control unit 101 interrupts the detection (acquisition for the operation) of the angular velocity to cancel the bias components of the angular velocities of the angular velocity sensors 103 and 105. Further, in a predetermined period of FIG. 4(C) (period from time t22 to time t24) before and after a timing (time t23) of interchanging the function of the primary side control circuit 12 and the function of the secondary side control circuit 13 in the angular velocity sensor 105, the control unit 101 interrupts the detection (acquisition for the operation) of the angular velocity to cancel the bias components of the angular velocities of the angular velocity sensors 103 and 104.

Further, the control unit 101 is configured so that, in the predetermined period before and after interchanging the function of the primary side control circuit 12 and the function of the secondary side control circuit 13 in any of the angular velocity sensors 103 to 105, the control unit 101 performs control for interchanging the function of the primary side control circuit 12 and the function of the secondary side control circuit 13 in the other of the angular velocity sensors 103 to 105. Specifically, the control unit 101 interchanges the function of the primary side control circuit 12 and the function of the secondary side control circuit 13 in the angular velocity sensors 104 and 105 in the predetermined period (period from time t2 to time t4) before and after the timing (time t3) of interchanging the function of the primary side control circuit 12 and the function of the secondary side control circuit 13 in the angular velocity sensor 103 of FIG. 4(A). Further, the control unit 101 interchanges the function of the primary side control circuit 12 and the function of the secondary side control circuit 13 in the angular velocity sensors 103 and 105 in the predetermined period (period from time t12 to time t14) before and after the timing (time t13) of interchanging the function of the primary side control circuit 12 and the function of the secondary side control circuit 13 in the angular velocity sensor 104 of FIG. 4(B). Further, the control unit 101 interchanges the function of the primary side control circuit 12 and the function of the secondary side control circuit 13 in the angular velocity sensors 103 and 104 in the predetermined period (period from time t22 to time t24) before and after the timing (time t23) of interchanging the function of the primary side control circuit 12 and the function of the secondary side control circuit 13 in the angular velocity sensor 105 of FIG. 4(C).

Preferably, the control unit 101 is configured to set the timings of interchanging the function of the primary side control circuit 12 and the function of the secondary side control circuit 13 in the angular velocity sensors 103, 104, and 105, to be approximately simultaneous. That is, the control unit 101 interchanges the function of the primary side control circuit 12 and the function of the secondary side control circuit 13 in the angular velocity sensors 103, 104, and 105 by setting time t3 in FIG. 4(A), time t13 in FIG. 4(B), and time t23 in FIG. 4(C) as the same timing.

Effects of First Embodiment

In the first embodiment, the following effects can be obtained.

In the first embodiment, as described above, there is provided the control unit configured so that, when the angular velocity to be used for the operation before and after interchanging the function of the primary side control circuit 12 and the function of the secondary side control circuit 13 is detected by any one of the angular velocity sensors 103 to 105, the control unit does not perform control for interchanging the function of the primary side control circuit 12 and the function of the secondary side control circuit 13 in the other of the angular velocity sensor in the angular velocity sensors 103 to 105. As a result, when the angular velocity to be used for the operation is detected by any of the angular velocity sensors 103 to 105, the function of the primary side control circuit 12 and the function of the secondary side control circuit 13 are not interchanged in the other of the angular velocity sensors 103 to 105. Therefore, the power of the commonly provided power supply unit 102 does not fluctuate due to the interchange of the function of the primary side control circuit 12 and the function of the secondary side control circuit 13. As a result, since power is stably supplied to the angular velocity sensors 103 to 105 from the power supply unit 102, it is possible to accurately detect the angular velocity to be used for the operation. As a result, it is possible to accurately detect the angular velocity in each of the plurality of angular velocity sensors 103 to 105 connected to the common power supply unit 102.

Further, in the first embodiment, as described above, the control unit 101 is configured to perform the operation of cancelling the bias component of the angular velocity detected by the angular velocity sensors 103 to 105 based on the detection result of the angular velocity at which the secondary vibration of the vibrator 11 is detected by the secondary side control circuit 13, and the detection result of the angular velocity at which the secondary vibration of the vibrator 11 is detected by the primary side control circuit 12 by interchanging the function of the primary side control circuit 12 and the function of the secondary side control circuit 13. As a result, it is possible to accurately calculate the bias component of the angular velocity detected by the angular velocity sensors 103 to 105 based on the angular velocity detected in a state in which the power is stably supplied from the power supply unit 102.

Further, in the first embodiment, as described above, the control unit 101 is configured to interrupt the detection of the angular velocity to cancel the bias component of the angular velocity in the predetermined period before and after interchanging the function of the primary side control circuit 12 and the function of the secondary side control circuit 13. As a result, the detection of the angular velocity to cancel the bias component of the angular velocity is interrupted in the period during which the power fluctuation of the power supply unit 102 is generated due to the interchange of the function of the primary side control circuit 12 and the function of the secondary side control circuit 13, so that it is possible to effectively suppress the detection accuracy of the angular velocity to be used for the operation of cancelling the bias component from decreasing.

Further, in the first embodiment, as described above, the control unit 101 is configured so that, in the predetermined period before and after interchanging the function of the primary side control circuit 12 and the function of the secondary side control circuit 13 in any of the angular velocity sensors 103 to 105, the control unit 101 performs control for interchanging the function of the primary side control circuit 12 and the function of the secondary side control circuit 13 in the other of the angular velocity sensors 103 to 105. As a result, it is possible to perform the timing of interchanging the function of the primary side control circuit 12 and the function of the secondary side control circuit 13 in the angular velocity sensors 103 to 105 in a predetermined period during which the detection of the angular velocity to cancel the bias component of the angular velocity is interrupted. As a result, when the angular velocity to cancel the bias component of the angular velocity is detected in parallel in the plurality of the angular velocity sensors 103 to 105, it is possible to accurately detect each angular velocity to be used for the operation.

Further, in the first embodiment, as described above, the control unit 101 is configured to set the timings of interchanging the function of the primary side control circuit 12 and the function of the secondary side control circuit 13 in the angular velocity sensors 103 to 105, to be approximately simultaneous. As a result, it is possible to minimize the predetermined period during which the detection of the angular velocity to cancel the bias component of the angular velocity is interrupted, so that it is possible to suppress the time for detecting the angular velocity to cancel the bias component from becoming longer.

Further, in the first embodiment, as described above, the vibrator 11 includes a ring-type vibrator. Here, since the ring-type vibrator has a symmetrical shape, a vibration mode by the primary side control circuit 12 and a vibration mode by the secondary side control circuit 13 are similar. As a result, it is not necessary to consider the influence of the difference in the vibration modes of the angular velocity sensors 103 to 105 including the ring-type vibrator 11.

Further, in the first embodiment, as described above, there is provided the control unit configured so that, when the angular velocity to be used for the operation before and after interchanging the function of inducing the primary vibration and the function of detecting the secondary vibration is detected by any of the angular velocity sensors 103 to 105, the control unit does not perform the control for interchanging the function of inducing the primary vibration and the function of detecting the secondary vibration in the other of the angular velocity sensors among the other of the angular velocity sensors 103 to 105. As a result, when the angular velocity to be used for the operation is detected by any of the angular velocity sensors 103 to 105, the function of inducing the primary vibration and the function of detecting the secondary vibration are not interchanged in the other of the angular velocity sensors 103 to 105. Therefore, the power of the power supply unit 102 provided in common does not fluctuate due to the interchange of the function of inducing the primary vibration and the function of detecting the secondary vibration. As a result, since power is stably supplied to the angular velocity sensors 103 to 105 from the power supply unit 102, it is possible to accurately detect the angular velocity to be used for the operation. As a result, it is possible to accurately detect the angular velocity in each of the plurality of angular velocity sensors 103 to 105 connected to the common power supply unit 102.

Second Embodiment

Next, the configuration of the azimuth/attitude angle measuring device 200 according to a second embodiment will be described with reference to FIGS. 5 to 7. In the second embodiment, unlike the first embodiment, an example of a configuration in which a plurality of angular velocity sensors are provided to detect a coaxial angular velocity will be described. Note that, the same components as in the first embodiment are designated by the same reference numerals, and the description thereof will be omitted.

Figure 5:
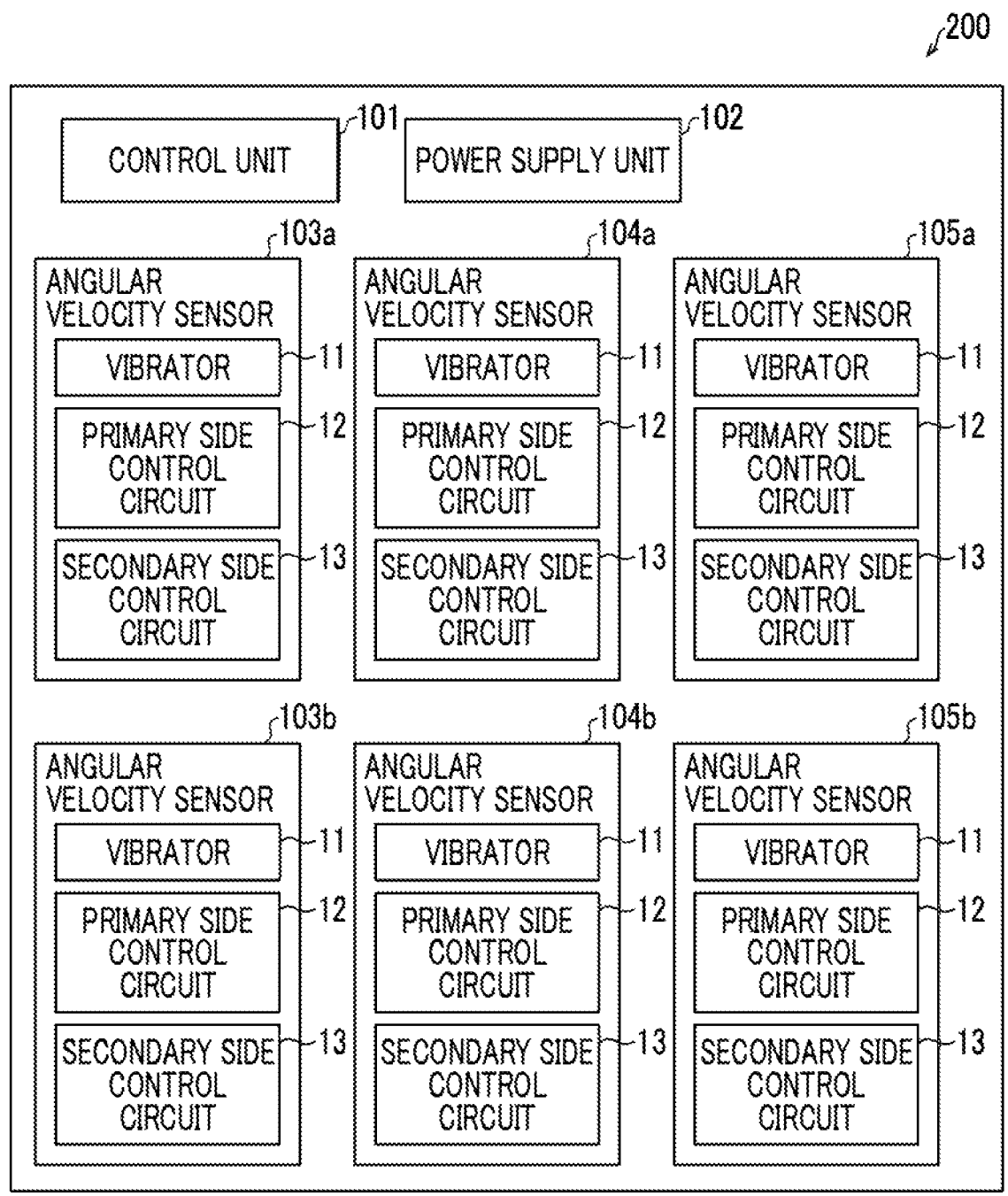
FIG. 5 is a block diagram showing a configuration of an azimuth/attitude angle measuring device according to a second embodiment.

As shown in FIG. 5, the azimuth/attitude angle measuring device 200 includes a control unit 101, a power supply unit 102, an angular velocity sensor 103a, an angular velocity sensor 103b, an angular velocity sensor 104a, an angular velocity sensor 104b, an angular velocity sensor 105a, and an angular velocity sensor 105b. The angular velocity sensors 103a and 103b, the angular velocity sensors 104a and 104b, and the angular velocity sensors 105a and 105b are configured to detect angular velocities around axes intersecting each other. Further, the angular velocity sensors 103a and 103b are configured to detect an angular velocity around axes parallel to or coaxial with each other. Further, the angular velocity sensors 104a and 104b are configured to detect an angular velocity around axes parallel to or coaxial with each other. Further, the angular velocity sensors 105a and 105b are configured to detect an angular velocity around axes parallel to or coaxial with each other.

Figure 6:
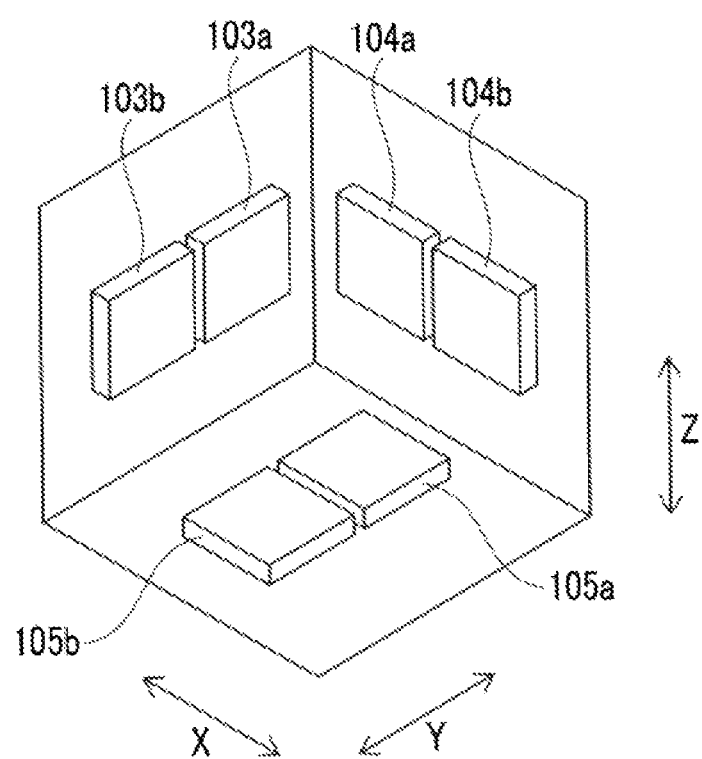
FIG. 6 is a perspective view showing a plurality of angular velocity sensors of the azimuth/attitude angle measuring device according to the second embodiment.
Figure 7:
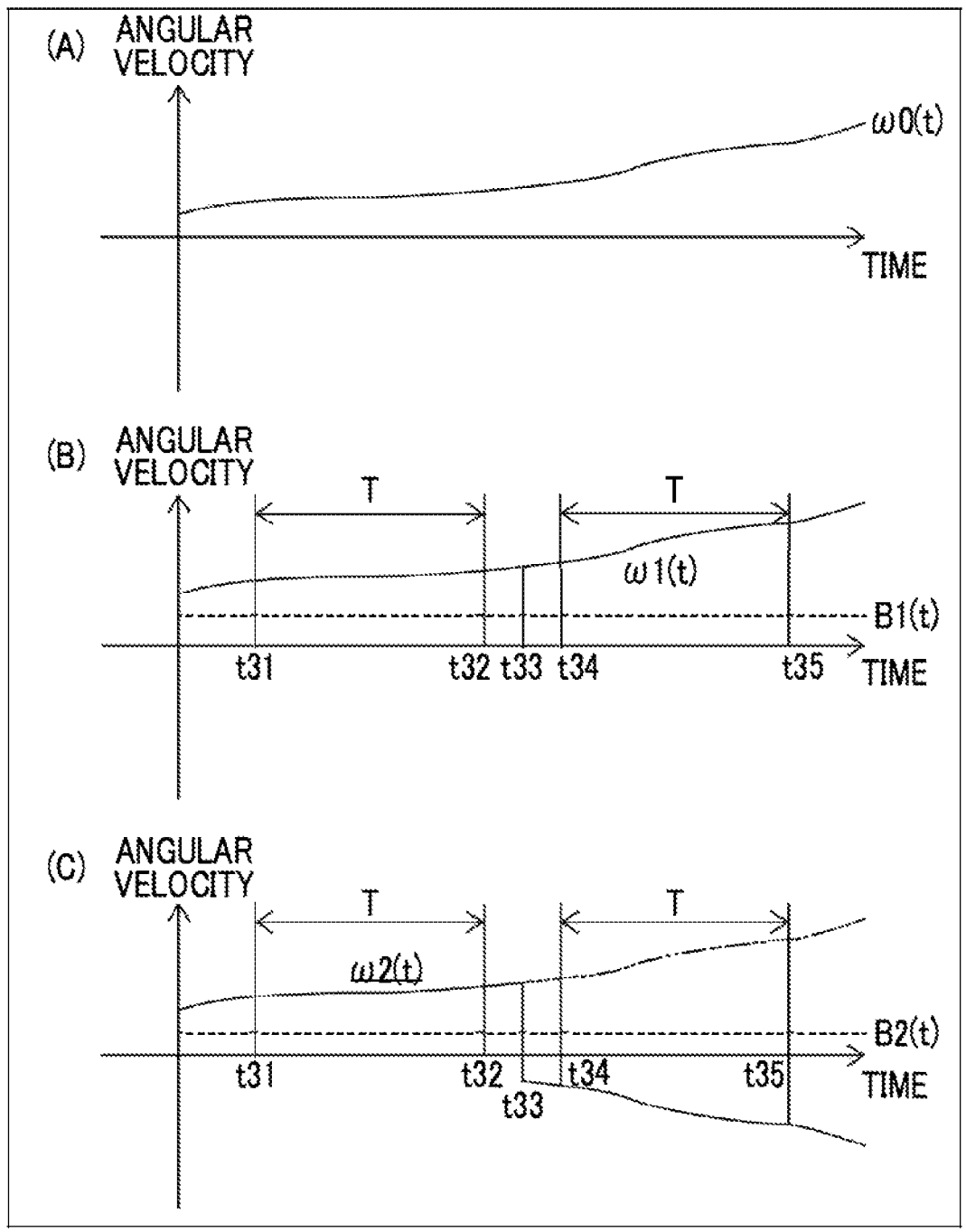
FIG. 7 is a diagram for explaining the calculation of the bias of the angular velocity sensor according to the second embodiment.

Specifically, as shown in FIG. 6, the angular velocity sensors 103a and 103b are configured to detect the angular velocity around the X axis. Further, the angular velocity sensors 104a and 104b are configured to detect the angular velocity around the Y axis. Further, the angular velocity sensors 105a and 105b are configured to detect the angular velocity around the Z axis. The angular velocity sensors 103a and 103b are disposed adjacent to each other. Further, the angular velocity sensors 104a and 104b are disposed adjacent to each other. Further, the angular velocity sensors 105a and 105b are disposed adjacent to each other. Note that, the angular velocity sensor 103a is an example of a "first angular velocity sensor" in the claims. Further, the angular velocity sensor 103b is an example of a "third angular velocity sensor" in the claims. Further, the angular velocity sensor 104a is an example of a "second angular velocity sensor" in the claims. Further, the angular velocity sensor 105a is an example of the "second angular velocity sensor" in the claims.

The power supply unit 102 is configured to supply power to the angular velocity sensors 103a, 103b, 104a, 104b, 105a, and 105b. Further, the power supply unit 102 is configured to supply AC power to the angular velocity sensors 103a, 103b, 104a, 104b, 105a, and 105b.

Here, in the second embodiment, the control unit 101 is configured so that, when the angular velocity to be used for the operation before and after interchanging the function as the primary side control circuit 12 and the function as the secondary side control circuit 13 is detected by any of the angular velocity sensors 103a, 103b, 104a, 104b, 105a, and 105b, the control unit 101 does not perform the control for interchanging the function of the primary side control circuit 12 and the function of the secondary side control circuit 13 in the other of the angular velocity sensor of the angular velocity sensors 103a, 103b, 104a, 104b, 105a, and 105b.

Further, the control unit 101 is configured so that, when the angular velocity to be used for the operation is detected by the angular velocity sensor 103b, the control unit 101 does not perform control for interchanging the function of the primary side control circuit 12 and the function of the secondary side control circuit 13 in the angular velocity sensor 103a.

Further, in the second embodiment, the control unit 101 is configured to perform control such that the angular velocity sensor 103a performs a process of detecting the angular velocity based on the secondary vibration of the vibrator 11 by the secondary side control circuit 13 in a predetermined period and a process of detecting the angular velocity based on the secondary vibration of the vibrator 11 by the primary side control circuit 12 by interchanging a function of the primary side control circuit 12 and the function of the secondary side control circuit 13.

Specifically, as shown in FIG. 7(C), in predetermined periods from time t31 to time t32 and from time t34 to time t35, the process of detecting the angular velocity based on the secondary vibration of the vibrator 11 by the secondary side control circuit 13 in the angular velocity sensor 103a and the process of detecting the angular velocity based on the secondary vibration of the vibrator 11 by the primary side control circuit 12 in the angular velocity sensor 103a are performed.

Further, the control unit 101 is configured to perform control for performing a process of detecting the angular velocity in the predetermined period by the angular velocity sensor 103b. Specifically, as shown in FIG. 7(B), in predetermined periods from time t31 to time t32 and from time t34 to time t35, the process of detecting the angular velocity based on the secondary vibration of the vibrator 11 by the secondary side control circuit 13 in the angular velocity sensor 103b is performed.

Further, the control unit 101 is configured to calculate a bias component (B1(t)) of the angular velocity sensor 103b based on a first detection result detected by the angular velocity sensor 103b in the predetermined period and a second detection result detected by the angular velocity sensor 103a in the predetermined period.

Further, the control unit 101 is configured to calculate the bias component of the angular velocity sensor 103b by subtracting the value of the second detection result detected by the angular velocity sensor 103a in the predetermined period from the value of the first detection result detected by the angular velocity sensor 103b in the predetermined period.

Note that, the predetermined period includes a first period (the period from time t31 to time t32) during which the process of detecting the angular velocity based on the secondary vibration of the vibrator 11 is performed by the secondary side control circuit 13, and a second period (the period from time t34 to time t35) during which the process of detecting the angular velocity based on the secondary vibration of the vibrator 11 is performed by the primary side control circuit 12. Further, the first period and the second period have the same length of time. As shown in FIG. 7, the first period and the second period each have a length of time T.

Further, the first detection result is an integral value of the angular velocity detected by the angular velocity sensor 103b in the predetermined period. Further, the second detection result is an integral value of the angular velocity detected by the angular velocity sensor 103a in the predetermined period.

Further, the predetermined period is a period during which the bias component of the angular velocity sensor 103a is approximately constant. For example, the predetermined period has a length of about several seconds to several tens of seconds. Further, the predetermined period is a period during which the influence of temperature change can be ignored and it is possible to assume that the bias component of the angular velocity sensor 103a does not approximately change.

An integral value I1 of the first detection result in the predetermined period (the first period from time t31 to time t32 and the second period from time t34 to time t35) shown in FIG. 7(B) is expressed as in Equation (1).

$$I1 = \int_{t31}^{t32} \omega1(t)dt + \int_{t34}^{t35} \omega1(t)dt \qquad \text{Equation (1)}$$

However, an angular velocity $\omega1(t)$ detected by the secondary side control circuit 13 in the angular velocity sensor 103b is expressed as in Equation (2) using an angular velocity (true angular velocity) $\omega0(t)$ generated by motion (movement) shown in FIG. 7(A) and the bias B1(t) of the angular velocity sensor 103b.

$$\omega1(t) = \omega0(t) + B1(t) \qquad \text{Equation (2)}$$

Therefore, Equation (1) is derived as in Equation (3).

$$I1 = \int_{t31}^{t32}(\omega0(t)) + B1(t)) + \int_{t34}^{t35}(\omega0)(t))dt$$

$$I1 = \int_{t31}^{t32}\omega0(t)dt + \int_{t31}^{t32}B1(t)dt + \int_{t34}^{t35}\omega0(t)dt + \int_{t34}^{t35}B1(t)dt \qquad \text{Equation (3)}$$

Further, an integral value I2 of the second detection result in the predetermined period (the first period from time t31 to time t32 and the second period from time t34 to time t35) shown in FIG. 7(C) is expressed as in Equation (4).

$$I2 = \int_{t31}^{t32}\omega2(t)dt - \int_{t34}^{t35}\omega2(t)dt \qquad \text{Equation (4)}$$

Note that, in the second period from time t34 to time t35, the integral value is subtracted in consideration of the fact that $\omega2(t)$ is reversed with respect to the bias component.

The angular velocity $\omega2(t)$ detected by the secondary side control circuit 13 in the angular velocity sensor 103a and the angular velocity $\omega2(t)$ detected by the primary side control circuit 12 are expressed in Equation (5) and Equation (6), respectively, using the angular velocity (true angular velocity) $\omega0(t)$ generated by the motion (movement) shown in FIG. 7(A) and the bias B2(t) of the angular velocity sensor 103a.

$$\omega2(t) = \omega0(t) + B2(t) \qquad \text{Equation (5)}$$

$$\omega2(t) = -\omega0(t) + B2(t) \qquad \text{Equation (6)}$$

In Equation (6) of the second period from time t34 to time t35, $\omega0(t)$ is reversed with respect to the bias component, so that a minus is applied.

Therefore, Equation (4) is derived as in Equation (7).

$$I2 = \int_{t31}^{t32}(\omega0(t) + B2(t))dt - \int_{t34}^{t35}(-\omega0(t) + B2(t))dt$$

$$I2 = \int_{t31}^{t32}\omega0(t)dt + \int_{t31}^{t32}B2(t)dt + \int_{t34}^{t35}\omega0(t)dt - \int_{t34}^{t35}B2(t)dt \qquad \text{Equation (7)}$$

When the integral value I2 of the second detection result is subtracted from the integral value I1 of the first detection result, Equation (4) is derived as in Equation (8).

$$I1 - I2 = \int_{t31}^{t32}\omega0(t)dt + \int_{t31}^{t32}B1(t)dt + \int_{t34}^{t35}\omega0(t)dt + \int_{t34}^{t35}B1(t)dt - \omega0(t)dt - \int_{t31}^{t32}B2(t)dt - \int_{t34}^{t35}\omega0(t)dt + \int_{t34}^{t35}B2(t)dt$$

$$I1 - I2 = \int_{t31}^{t32}B1(t)dt + \int_{t31}^{t32}B1(t)dt + \int_{t31}^{t32}B2(t)dt - \int_{t34}^{t35}B2(t)dt \qquad \text{Equation (8)}$$

Here, in the first period from time t31 to time t32 and the second period from time t34 to time t35, the amount of change over time of each of the bias B1(t) of the angular velocity sensor 103b and the bias B2(t) of the angular velocity sensor 103*a* is negligible (constant), so that it can be assumed that Equation (9) and Equation (10) hold.

$$\int_{t1}^{t2} B1(t)dt = \int_{t4}^{t5} B1(t)dt = B1*T \qquad \text{Equation (9)}$$

$$\int_{t1}^{t2} B2(t)dt = \int_{t4}^{t5} B2(t)dt = B1*T \qquad \text{Equation (10)}$$

However, B1 is the bias value of the angular velocity sensor 103*b* in the first period and the second period, and B2 is the bias value of the angular velocity sensor 103*a* in the first period and the second period.

Therefore, Equation (11) is derived from Equation (8).

$$I1 - I2 = 2*B1*T \qquad \text{Equation (11)}$$

Since T is known, the bias value B1 of the angular velocity sensor 103*b* is calculated by dividing (I1-I2) by 2T. The calculated bias value B1 is used for angular velocity detection by the angular velocity sensor 103*b*. For example, the bias value B1 is used as an observation update of the Kalman filter.

Note that, the relationship between Equation (9) and Equation (10) may be established in the period during which the control is performed for interchanging the function of the primary side control circuit 12 and the function of the secondary side control circuit 13 in the angular velocity sensor 103*a* and the angular velocity is measured to calculate the bias value B1. Therefore, for example, even when the time interval (t36-t35) up to time t36, which is the start point of a next process, is large and B1 changes, correction is possible by the process from next time t36. However, in order to always reduce the change in B1, it is preferable to make the time interval (t36-t35) sufficiently small.

Here, there is a case where the relationship of Equation (10) may not hold in the period during which the control is performed for interchanging the function as the primary side control circuit 12 and the function as the secondary side control circuit 13 in the angular velocity sensor 103*a* and the angular velocity for calculating the bias value B1 is measured. That is, there is a case where Equation (12) is hold.

$$\int_{t31}^{t32} B2(t)dt - \int_{t34}^{t35} B2(t)dt = \alpha (\neq 0) \qquad \text{Equation (12)}$$

Even in this case, at the start of operation (at the start of movement), α is added, and the bias components are mutually corrected using the two angular velocity sensor 103*b* and the angular velocity sensor 103*a*, so that it is possible to cope with the time change of the bias components (B2(t)).

That is, the control unit 101 calculates the bias component of the angular velocity sensor 103*b* based on the first detection result detected by the angular velocity sensor 103*b* in the first predetermined period and the second detection result detected by the angular velocity sensor 103*a* in the first predetermined period. Further, the control unit 101 calculates the bias component of the angular velocity sensor 103*a* by using the angular velocity detected by the angular velocity sensor 103*a* in the second predetermined period and the bias component of the angular velocity sensor 103*b*. Then, the control unit 101 alternately repeats the controls. That is, the bias component B1 of the angular velocity sensor 103*b* is corrected by calculating the first bias component. In the next cycle, the corrected B1 is used to calculate a of B2, which is the bias component of the angular velocity sensor 103*a*. Then, in the next cycle, the corrected a is used to correct B1 which is the bias component of the angular velocity sensor 103*b*. After that, the processes are alternately repeated.

Note that, before the start of movement at the start of operation, a is obtained in a stationary state (a state in which the angular velocity ω0(t) is constant), and then a (t) may be sequentially corrected as described above.

Further, the process of calculating and cancelling the bias components of the angular velocity sensors 104*a* and 104*b* is the same as the process of calculating and cancelling the bias components of the angular velocity sensors 103*a* and 103*b*. Further, the process of calculating and cancelling the bias components of the angular velocity sensors 105*a* and 105*b* is the same as the process of calculating and cancelling the bias components of the angular velocity sensors 103*a* and 103*b*.

Other configurations of the second embodiment are the same as in the first embodiment.

Effect of Second Embodiment

In the second embodiment, similarly to the first embodiment, since power is stably supplied to the angular velocity sensors 103*a*, 103*b*, 104*a*, 104*b*, 105*a*, and 105*b* from the power supply unit 102, it is possible to accurately detect the angular velocity to be used for the operation. As a result, it is possible to accurately detect the angular velocity in each of the plurality of angular velocity sensors 103*a*, 103*b*, 104*a*, 104*b*, 105*a*, and 105*b* connected to the common power supply unit 102.

Further, in the second embodiment, as described above, the control unit 101 is configured not to perform control in which, when detecting the angular velocity to be used for the operation in the angular velocity sensor 103*b*, the function of the primary side control circuit 12 and the function of the secondary side control circuit 13 are interchanged in the angular velocity sensor 103*a*. As a result, in the configuration provided with the angular velocity sensor 103*a* and the angular velocity sensor 103*b* that detect the angular velocity around the same axis, it is possible to accurately detect the angular velocity to be used for the operation in the angular velocity sensor 103*b*.

Further, the other effects of the second embodiment are the same as in the first embodiment.

Modification Example

Note that, it should be noted that the embodiments disclosed this time are exemplary in all aspects and are not restrictive. The scope of the present invention is shown by the claims rather than the description of the embodiment described above, and further includes all modifications within the meaning and scope equivalent to the claims.

For example, in the first and second embodiments, an example in which the ring-type vibrator is used is shown, but the present invention is not limited thereto. For example, the vibrator may have a symmetrical shape, and a vibrator having a disk type, a cup type (wine glass type), an octagonal type, or the like may be used.

Further, in the first and second embodiments, an example in which the closed control loop is configured by the vibrator, the amplifier circuit, the synchronous detection circuit, the loop filter, the modulation circuit, and the drive circuit is shown, but the present invention is not limited thereto. For example, the control loop may be configured by a configuration other than the configuration consisting of the amplifier circuit, the synchronous detection circuit, the loop filter, the modulation circuit, and the drive circuit.

Further, in the first and second embodiments, an example in which an integral filter is used as the loop filter is shown, but, for example, a loop filter other than the integral filter may be used.

Further, in the second embodiment, similarly to the angular velocity sensor 103a (104a, 105a) (first angular velocity sensor), an example is shown in which the function of the primary side control circuit and the function of the secondary side control circuit are interchangeable in the angular velocity sensor 103b (104b, 105b) (third angular velocity sensor) that detects the angular velocity around the axis parallel to the angular velocity sensor 103a (104a, 105a) (first angular velocity sensor). However, the present invention is not limited thereto. In the present invention, in the third angular velocity sensor, the function of the primary side control circuit and the function of the secondary side control circuit may be fixed (may not be interchanged).

Further, in the first and second embodiments, an example of a configuration is shown in which a plurality of angular velocity sensors that detect the angular velocities around the three axes of the X axis, the Y axis, and the Z axis which are orthogonal to each other are provided. However, the present invention is not limited thereto. In the present invention, a plurality of angular velocity sensors that detect the angular velocities around two axes in different directions may be provided. Further, a plurality of angular velocity sensors that detect the angular velocities around the axes of four axes in different directions may be provided. Further, the axes of the angular velocities detected by the plurality of angular velocity sensors may be in different directions that are not orthogonal to each other.

Further, in the second embodiment, an example of a configuration is shown in which two angular velocity sensors that detect the angular velocities around parallel axes are provided. However, the present invention is not limited thereto. In the present invention, three or more angular velocity sensors that detect the angular velocities around parallel axes may be provided, or a plurality of angular velocity sensors may be provided for some of the axes and one angular velocity sensor may be provided for the other axes.

REFERENCE SIGNS LIST

11 Vibrator
12 Primary side control circuit
13 Secondary side control circuit
100 Azimuth/attitude angle measuring device
101 Control unit
102 Power supply unit
103, 103a Angular velocity sensor (first angular velocity sensor)
103b Angular velocity sensor (third angular velocity sensor)
104, 104a Angular velocity sensor (second angular velocity sensor)
105, 105a Angular velocity sensor (second angular velocity sensor)

The invention claimed is:

1. An azimuth/attitude angle measuring device comprising:
a first angular velocity sensor that detects an angular velocity around a first axis;
a second angular velocity sensor that detects an angular velocity around a second axis in a direction different from the first axis;
a power supply unit that supplies power to the first angular velocity sensor and the second angular velocity sensor; and
a control unit, wherein
the first angular velocity sensor and the second angular velocity sensor each include
a vibrator,
a primary side control circuit that has a closed control loop, an output of the closed control loop inducing primary vibration in the vibrator, and
a secondary side control circuit that has a closed control loop for detecting secondary vibration generated in the vibrator due to an angular velocity applied to the vibrator,
the primary side control circuit and the secondary side control circuit are configured so that a function as the primary side control circuit and a function as the secondary side control circuit are interchangeable, and
the control unit is configured so that, when an angular velocity to be used for an operation before and after interchanging the function of the primary side control circuit and the function of the secondary side control circuit is detected by one of the first angular velocity sensor and the second angular velocity sensor, the control unit does not perform control for interchanging the function of the primary side control circuit and the function of the secondary side control circuit in the other of the first angular velocity sensor and the second angular velocity sensor.

2. The azimuth/attitude angle measuring device according to claim 1, wherein
the control unit is configured to perform an operation of cancelling a bias component of the angular velocity detected by the first angular velocity sensor and the second angular velocity sensor based on a detection result of the angular velocity at which the secondary vibration of the vibrator is detected by the secondary side control circuit, and a detection result of the angular velocity at which the function of the primary side control circuit and the function of the secondary side control circuit is interchanged, and the secondary vibration of the vibrator is detected by the primary side control circuit.

3. The azimuth/attitude angle measuring device according to claim 2, wherein
the control unit is configured to interrupt detection of an angular velocity to cancel the bias component of the angular velocity in a predetermined period before and after interchanging the function of the primary side control circuit and the function of the secondary side control circuit.

4. The azimuth/attitude angle measuring device according to claim 1, wherein
the control unit is configured so that, in a predetermined period before and after interchanging the function of the primary side control circuit and the function of the secondary side control circuit in one of the first angular velocity sensor and the second angular velocity sensor, the control unit performs control for interchanging the function of the primary side control circuit and the function of the secondary side control circuit in the other of the first angular velocity sensor and the second angular velocity sensor.

5. The azimuth/attitude angle measuring device according to claim 4, wherein
the control unit is configured to set timings of interchanging the function of the primary side control circuit and the function of the secondary side control circuit in the first angular velocity sensor and the second angular velocity sensor, to be approximately simultaneous.

6. The azimuth/attitude angle measuring device according to claim 1, further comprising:
a third angular velocity sensor that includes a vibrator and detects the angular velocity around the first axis, wherein
the power supply unit is configured to supply power to the third angular velocity sensor in addition to the first angular velocity sensor and the second angular velocity sensor, and
the control unit is configured so that, when the angular velocity to be used for the operation is detected by the third angular velocity sensor, the control unit does not perform control for interchanging the function of the primary side control circuit and the function of the secondary side control circuit in the first angular velocity sensor.

7. An azimuth/attitude angle measuring device comprising:
a first angular velocity sensor that detects an angular velocity around a first axis;
a second angular velocity sensor that detects an angular velocity around a second axis in a direction different from the first axis;
a power supply unit that supplies power to the first angular velocity sensor and the second angular velocity sensor; and
a control unit, wherein
the first angular velocity sensor and the second angular velocity sensor each include
a vibrator,
a primary side control circuit that has a closed control loop, an output of the closed control loop inducing primary vibration in the vibrator, and
a secondary side control circuit that has a closed control loop for detecting secondary vibration generated in the vibrator due to an angular velocity applied to the vibrator,
a configuration is made so that a function of inducing the primary vibration and a function of detecting the secondary vibration are interchangeable, and
the control unit is configured so that, when an angular velocity to be used for an operation before and after interchanging the function of inducing the primary vibration and the function of detecting the secondary vibration is detected by one of the first angular velocity sensor and the second angular velocity sensor, the control unit does not perform control for interchanging the function of inducing the primary vibration and the function of detecting the secondary vibration in the other of the first angular velocity sensor and the second angular velocity sensor.

8. The azimuth/attitude angle measuring device according to claim 7, wherein
the control unit is configured to perform an operation of cancelling a bias component of the angular velocity detected by the first angular velocity sensor and the second angular velocity sensor based on a detection result of the angular velocity at which the secondary vibration of the vibrator is detected, and a detection result of the angular velocity at which the secondary vibration of the vibrator is detected by interchanging the function of inducing the primary vibration and the function of detecting the secondary vibration.

9. The azimuth/attitude angle measuring device according to claim 8, wherein
the control unit is configured to interrupt detection of an angular velocity to cancel the bias component of the angular velocity in a predetermined period before and after interchanging the function of inducing the primary vibration and the function of detecting the secondary vibration.

10. The azimuth/attitude angle measuring device according to claim 7, wherein
the control unit is configured so that, in a predetermined period before and after interchanging the function of inducing the primary vibration and the function of detecting the secondary vibration in one of the first angular velocity sensor and the second angular velocity sensor, the control unit performs control for interchanging the function of inducing the primary vibration and the function of detecting the secondary vibration in the other of the first angular velocity sensor and the second angular velocity sensor.

11. The azimuth/attitude angle measuring device according to claim 10, wherein
the control unit is configured to set timings of interchanging the function of inducing the primary vibration and the function of detecting the secondary vibration in the first angular velocity sensor and the second angular velocity sensor, to be approximately simultaneous.

12. The azimuth/attitude angle measuring device according to claim 7, further comprising:
a third angular velocity sensor that includes a vibrator and detects the angular velocity around the first axis, wherein
the power supply unit is configured to supply power to the third angular velocity sensor in addition to the first angular velocity sensor and the second angular velocity sensor, and
the control unit is configured so that, when the angular velocity to be used for the operation is detected by the third angular velocity sensor, the control unit does not perform control for interchanging the function of inducing the primary vibration and the function of detecting the secondary vibration in the first angular velocity sensor.

* * * * *